United States Patent
Brugh et al.

(10) Patent No.: US 12,446,565 B2
(45) Date of Patent: *Oct. 21, 2025

(54) LIVE BIRD CAPTURE SYSTEM

(71) Applicant: Meridian Wildlife Services, LLC, Christiansburg, VA (US)

(72) Inventors: David Henry Brugh, Christiansburg, VA (US); Brian Chandler Burke, Troutville, VA (US)

(73) Assignee: Meridian Wildlife Services, LLC, Christiansburg, VA (US)

( * ) Notice: Subject to any disclaimer, the term of this patent is extended or adjusted under 35 U.S.C. 154(b) by 92 days.

This patent is subject to a terminal disclaimer.

(21) Appl. No.: 16/185,976

(22) Filed: Nov. 9, 2018

(65) Prior Publication Data

US 2019/0075780 A1    Mar. 14, 2019

Related U.S. Application Data

(60) Continuation-in-part of application No. 15/851,925, filed on Dec. 22, 2017, now Pat. No. 10,154,663, which is a division of application No. 15/048,231, filed on Feb. 19, 2016, now Pat. No. 9,943,073.

(51) Int. Cl.
*A01M 23/00* (2006.01)
*A01K 37/00* (2006.01)
*B25G 1/04* (2006.01)

(52) U.S. Cl.
CPC .............. *A01M 23/00* (2013.01); *A01K 37/00* (2013.01); *B25G 1/04* (2013.01)

(58) Field of Classification Search
CPC ....... A01M 23/00; A01M 23/02; A01K 37/00; A01K 31/07; A01K 77/00; B25G 1/04; A63B 71/04

USPC ................... 119/713, 717; 43/58, 60, 62, 63
See application file for complete search history.

(56) References Cited

U.S. PATENT DOCUMENTS

| | | | |
|---|---|---|---|
| 102,761 A | 5/1870 | Brooks |
| 117,729 A | 8/1871 | Bebout |
| 234,004 A | 11/1880 | Dolley |
| 433,241 A | 7/1890 | Hawkins, Jr. |
| 1,479,889 A | 1/1924 | Brown |
| 1,612,608 A | 12/1926 | Chamberlin |
| 1,765,144 A | 6/1930 | Gibbs |
| 1,816,269 A | 7/1931 | Topp |

(Continued)

FOREIGN PATENT DOCUMENTS

| CN | 202857644 U | 4/2013 |
|---|---|---|
| CN | 103598174 A | 2/2014 |

(Continued)

OTHER PUBLICATIONS

Meyers, Jason M. and Keith L Pardieck. "Evaluation of three elevated mist-net systems for sampling birds." Journal of Field Ornithology 64 (1993): 270-277.*

(Continued)

*Primary Examiner* — Peter M Poon
*Assistant Examiner* — Danielle A Clerkley
(74) *Attorney, Agent, or Firm* — Williams Mullen; R. Brian Drozd

(57) ABSTRACT

A device for raising a flying vertebrate capture netting and attaching to a portion of the ceiling wherein there is a hook assembly attached to a telescoping pole for attachment.

20 Claims, 3 Drawing Sheets

(56) References Cited

U.S. PATENT DOCUMENTS

| | | | | |
|---|---|---|---|---|
| 1,921,323 | A * | 8/1933 | Purdon | A01K 77/00 43/12 |
| 2,595,597 | A * | 5/1952 | Morseth | A01K 77/00 285/302 |
| 2,839,867 | A | 6/1958 | Knutsen | |
| 3,004,362 | A * | 10/1961 | Day | A01K 77/00 403/328 |
| 3,450,100 | A | 6/1969 | Cuculic | |
| 3,531,148 | A * | 9/1970 | Rohde | A01K 97/14 294/26 |
| 3,833,193 | A * | 9/1974 | Benz | A47L 11/38 248/647 |
| 4,420,883 | A * | 12/1983 | Wallace | A01G 3/0255 30/251 |
| 4,571,875 | A * | 2/1986 | Ballas | A01K 77/00 43/11 |
| 4,791,753 | A | 12/1988 | Fuhrman | |
| 5,319,821 | A * | 6/1994 | Nicholson | A46B 15/00 15/104.8 |
| 5,501,026 | A * | 3/1996 | Bryant | A01K 77/00 43/11 |
| 5,655,766 | A | 8/1997 | Klebe, Jr. | |
| 5,966,862 | A | 10/1999 | Ueno | |
| 6,732,471 | B2 | 5/2004 | Draper | |
| 6,776,733 | B2 | 8/2004 | Schroeder | |
| 7,191,907 | B2 | 3/2007 | Conway | |
| 7,322,146 | B1 * | 1/2008 | Baldwin | A01K 77/00 24/303 |
| 7,344,458 | B2 | 3/2008 | Connerley et al. | |
| 8,573,565 | B1 | 11/2013 | Lyndaker et al. | |
| 8,733,291 | B2 | 5/2014 | Dunigan | |
| 8,800,157 | B2 | 8/2014 | Lorhpipat | |
| 9,522,466 | B2 * | 12/2016 | Conway | B25G 1/04 |
| 10,251,374 | B2 | 4/2019 | Tolley | |
| 10,729,108 | B2 | 8/2020 | Tolley | |
| 11,064,683 | B2 | 7/2021 | Tolley | |
| 2005/0155284 | A1 | 7/2005 | Kulas | |
| 2005/0166441 | A1 | 8/2005 | Mattox | |
| 2010/0120558 | A1 | 5/2010 | Conforti et al. | |
| 2013/0081323 | A1 | 4/2013 | Alfarhan | |
| 2013/0190109 | A1 | 7/2013 | Rigoli | |
| 2014/0141906 | A1 | 5/2014 | Hulbert | |
| 2015/0059234 | A1 | 3/2015 | Dykes et al. | |
| 2015/0296766 | A1 | 10/2015 | Gaskamp et al. | |
| 2017/0238524 | A1 | 8/2017 | Brugh et al. | |

FOREIGN PATENT DOCUMENTS

| | | | |
|---|---|---|---|
| CN | 203416746 U | 2/2014 | |
| CN | 203424205 U | 2/2014 | |
| FR | 911970 A * | 7/1946 | A01K 77/00 |
| JP | 5023090 A | 2/1993 | |
| JP | 5123074 A | 5/1993 | |
| JP | 6133665 A | 5/1994 | |
| JP | 9074976 A | 3/1997 | |

OTHER PUBLICATIONS

Bird Barrier American Channel—An Installation Guide To—Mist Net Kit Assembly and Use (YouTube video published Jan. 26, 2016) https://youtu.be/W81QB2Uo9zl.*

Thomas H. Kunz et al., Assessing Impacts of Wind-Energy Development on Nocturnally Active Birds and Bats: A Guidance Document, Journal of Wildlife Management 71(8), pp. 2449-2486 (Year: Nov. 2007).*

"How can I catch a wild bird inside a store?", Yahoo Answers, http://answer.yahoo.com/question/index?qid=20090404110049AA1QcVW, Jul. 2, 2015.

Mist Net Kit Assembly and Use. Video 3:52 minutes, posted Aug. 29, 2014. Available at: https://www.youtube.com/watch?v=yHtYi-vUFXs.

Thomas H. Kunz et al., Ecological and Behavioral Methods for the Study of Bats 1-29 (1st ed. 1990).

Bird Barrier Mist Net Kit Products Webpage (from p. 6 of Exhibit A to Frank-White Affidavit) available at https://web.archive.org/web/20150919150636/http://www.birdbarrier.com/products/mist-net-kits/.

Bird Barrier 2013 Product Catalog (from pp. 135-194 of Exhibit B to Frank-White Affidavit) available at https://web.archive.org/web/20130509202821/http:/www.birdbarrier.com/library/bird-barrier-catalog.pdf.

Balazs I. Elody et al., A Mist Net Technique Useful for Capturing Barred Owls, 9 N. Am. Bird Bander 13-14 (1984).

Tuttle, M.D. 1976a. Collecting Techniques. Pp. 71-78, in Biology of the bats of the New World family Phyllostomatidae. Part I (R.J. Baker, D.C. Carter, and J.K. Jones, Jr., eds.) Spec. Publ. Mus., Texas Tech Univ., Lubbock, Texas, 218 pp.

Sanford D. Schemnitz et al., Capturing and Handling Wild Animals, in The Wildlife Techniques Manual 232-69 (Nova J. Silvy ed.,2009).

Paul A. Racey, Book Review, Zoological Journal of the Linnean Society, 2011, 162, 243.

Bird-B-Gone 2014 Product Catalog, (from pp. 21-80 of Exhibit B to Frank-White Affidavit) available at https://webarchive.org/web/20140726064216/http:/www.birdbgone.com/media/PDFs/BirdBGone_Catalog_2014_SM.pdf.

Bird-B-Gone 2016 Product Catalog, (from pp. 82-133 of Exhibit B to Frank-White Affidavit) available at https://web.archive.org/web/20160415224522/https:/www.birdbgone.com/media/PDFs/2016-product-catalog.pdf.

J. Michael Meyers, In My Experience: Improved CaptureTechniques for Psittacines, 22 Wildl. Soc. Bull. 511-516 (1994).

C.E. Shackelford et al. Project Prairie Birds: A citizen science project for wintering grassland birds, Texas Parks and Wildlife Department Publication, PWD BK W7000-485, 2001, Austin, TX. 24 pp. Available online at http://www.tpwd.state.tx.US/publications/pwdpubs/medialpwd_bk_w7000_0485.pdf.

Jerome A. Jackson, A Simple, Effective Net for Capturing Cavity Roosting Birds, 16 N. Am. Bird Bander, 30-31 (1991).

William G. Sheldon, A Method of Mist Netting Woodcocks in Summer, 31 Bird Banding 130-135 (1960).

Bird-B-Gone Mist Net Capture Kits, available at https://web.archive.org/web/20160518205547/https://www.birdbgone.com/media/Literature BBG_Mist_Net_Capture_Kit_2014_v1.pdf.

Bruce A. Colvin et al., Techniques for Capturing Common Barn-Owls, 57 J. Field Ornithol. 200-207 (1986).

Seth H. Low, Banding with Mist Nets, 28 Bird Banding, 115-128 (1957).

Brian E. Keyes et al., Capturing Birds with Mist Nets: A Review, 7N. Am. Bird Bander 2-14 (1982).

Peter H. Bloom et al., Capture techniques: 12, p. 193-219 from Raptor Research and management techniques, (2d. ed., 2007).

Stephen G. Martin, A Technique for Capturing Nesting Grassland Birds with Mist Nets, 40 Bird Banding 233-237 (1969).

C. John Ralph et al., Recommendations for the Use of Mist Nets for Inventory and Monitoring of Bird Populations, 29 Studies in Avian Biology 187-196 (2004).

Bird Hazing Manual (W. Paul Gorenzel & Terrell P. Salmon eds., 1st ed., 2008).

Gene Albanese et al., An Inexpensive Elevated Mist Net Apparatus, 24 N. Am. Bird Bander 129-134 (1999).

H. Elliott McClure, Methods of Bird Netting in Japan Applicable to Wildlife Management Problems, 27 Bird Banding 67-73 (1956).

Paper 12. Decision Denying Institution of Inter Partes Review IPR2023-01341 U.S. Pat. No. 10,154,663B2, dated Feb. 22, 2024. 40 pages.

Paper 12. Decision Denying Institution of Inter Partes Review IPR2023-01340 U.S. Pat. No. 9,943,073 B2, dated Feb. 22, 2024. 40 pages.

IPR2022-01233, Petition for Inter Partes Review (374 patent).
IPR2022-01253, EX1004 (Chamberlain Declaration).
IPR2022-01253, Patent Owner's Preliminary Response.
IPR2022-01253, EX2001 (Tolley Declaration).
IPR2022-01253, Reply to Patent Owner's Preliminary Response.
IPR2022-01253, Patent Owner's Sur-Reply to Petitioner's Reply.

(56) References Cited

OTHER PUBLICATIONS

IPR2022-01253, Institution Decision.
IPR2022-01253, Petitioner's Request for Rehearing.
IPR2022-01253, Rehearing: Decision on Request for Rehearing.
IPR2022-01254, Petition for Inter Partes Review (108 patent).
IPR2022-01254, Patent Owner's Preliminary Response.
IPR2022-01254, EX2001 (Tolley Declaration).
IPR2022-01254, Reply to Patent Owner's Preliminary Response.
IPR2022-01254, Patent Owner's Sur-Reply to Petitioner's Reply.
IPR2022-01254, Institution Decision.
IPR2022-01254, Petitioner's Request for Rehearing.
IPR2022-01254, Rehearing: Decision on Request for Rehearing.
IPR2022-01254, EX1004 (Chamberlain Declaration).
IPR2022-01340, Petition for Inter Partes Review (683 patent).
IPR2022-01340, EX1004 (Chamberlain Declaration).
IPR2022-01340, Patent Owner's Preliminary Response.
IPR2022-01340, EX2001 (Tolley Declaration).
IPR2022-01340, Reply to Patent Owner's Preliminary Response.
IPR2022-01340, Patent Owner's Sur-Reply to Petitioner's Reply.
IPR2022-01340, Institution Decision.
IPR2022-01340, Petitioner's Request for Rehearing.
IPR2022-01340, Rehearing: Decision on Request for Rehearing.
IPR2023-01340, Petition for Inter Partes Review (073 patent).
IPR2023-01340, Patent Owner's Preliminary Response.
IPR2023-01340, Petitioner's Reply to Patent Owner's Preliminary Response.
IPR2023-01341, Petition for Inter Partes Review (663 patent).
IPR2023-01341, Patent Owner's Preliminary Response.
IPR2023-01341, Petitioner's Reply to Patent Owner's Preliminary Response.
IPR2023-01340, Patent Owner's Sur-Reply to Petitioner's Reply to Patent Owner's Preliminary Response.
IPR2023-01341, Patent Owner's Sur-Reply to Petitioner's Reply to Patent Owner's Preliminary Response.

* cited by examiner

LIVE BIRD CAPTURE SYSTEM

This application is a continuation-in-part of U.S. non-provisional application Ser. No. 15/851,925 filed on Dec. 22, 2017 which is a divisional of U.S. non-provisional application Ser. No. 15/048,231 filed on Feb. 19, 2016, now issued U.S. Pat. No. 9,943,073 issued on Apr. 17, 2018 and which are incorporated herein in their entirety by reference.

COPYRIGHT NOTICE

A portion of the disclosure of this patent contains material that is subject to copyright protection. The copyright owner has no objection to the reproduction by anyone of the patent document or the patent disclosure as it appears in the Patent and Trademark Office patent files or records, but otherwise reserves all copyright rights whatsoever.

BACKGROUND OF THE INVENTION

Field of the Invention

The present invention relates to the live capture of flying vertebrates in a covered setting. In particular, it relates to a net deploying system designed for hanging on an overhead fixture. It also relates to detachable hooks for use in deploying the net.

Description of Related Art

The advent of large warehouses, big box stores, large grocery stores, malls, and the like, has caused an increase in the number of birds, as well as other large flying vertebrates, such as bats, finding their way inside the buildings. Depending on the species, if there is no action to get rid of the flying vertebrate, it can remain in the building for an extended time. This can cause the spread of disease, problems because of defecation, annoyance to customers, as well as the destruction of products inside the store.

A number of methods are utilized to capture flying vertebrates. Traps are used, but frequently the traps are not very humane. Birds are somewhat attracted to light, so that dimming the store lights and hoping the vertebrate will head for the outside light is also utilized. Netting can be setup inside the building, but the time it takes to set up the net is lengthy, and if the net misses the vertebrate, it needs to be taken down and set up again. All these methods can lead to harming the vertebrate, while they are also not entirely effective. Though these methods have been around for decades, there is a need for a better method of removing flying vertebrates from a large building.

BRIEF SUMMARY OF THE INVENTION

The present invention relates to a more humane flying vertebrate capture system, with the use of telescoping or height adjustable support poles with a hook and pulley, for deploying a bird netting with or without pockets. The bird netting can be deployed, repositioned, and lowered for capture much quicker and easier than nets directly attached to the roof or rafters, thus allowing for a much higher chance of recovering the flying vertebrate without harm.

Accordingly, in one embodiment, there is a hook assembly designed for a flying vertebrate capture net deployment and designed for attachment to a telescoping pole comprising:

a) a hook portion designed to attach to a portion of the ceiling in a building;
b) a pulley attached to the hook; and
c) an adaptor positioned at the bottom of the hook assembly which is designed for quick attachment and release from a top of the telescoping pole.

In another embodiment, there is a device for raising a flying vertebrate capture net comprising:

a) a telescoping pole; and
b) a hook assembly attached to the top of the telescoping pole designed to attach to a portion of the ceiling in a building comprising:
   i. a hook portion for attachment to a portion of the ceiling; and
   ii. a pulley attached to the hook.

DETAILED DESCRIPTION OF THE INVENTION

Figure 1:
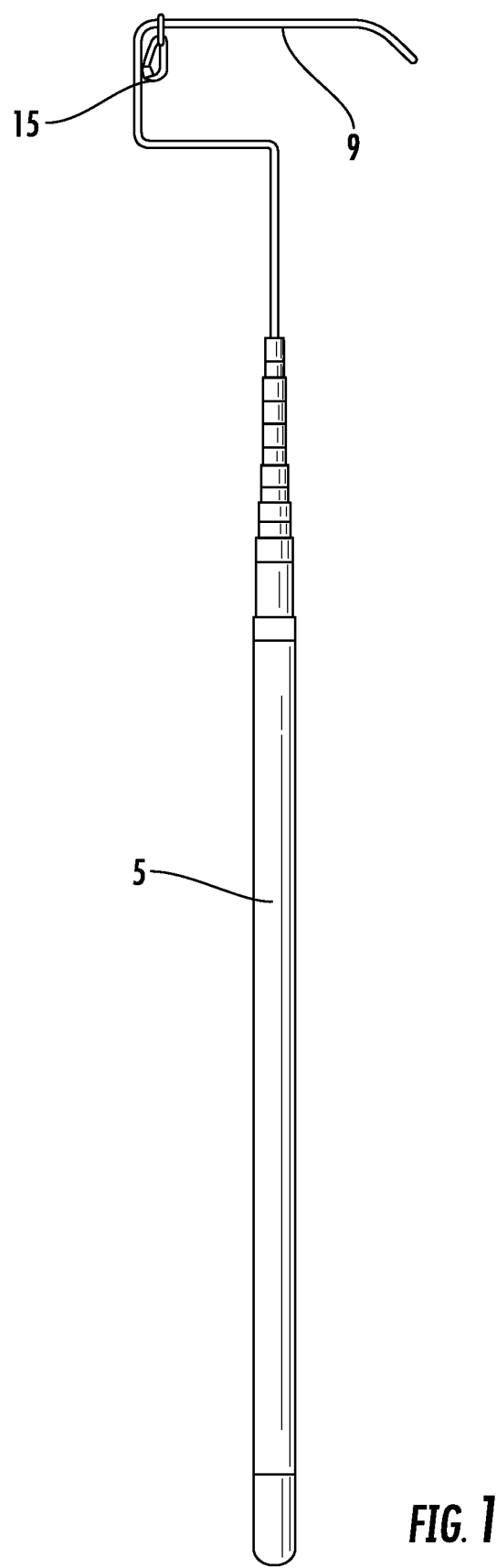
FIG. 1 is a perspective view of the system of the present invention's height adjustable pole with the hook assembly attached.

While this invention is susceptible to embodiment in many different forms, there is shown in the drawings, and will herein be described in detail, specific embodiments with the understanding that the present disclosure of such embodiments is to be considered as an example of the principles and not intended to limit the invention to the specific embodiments shown and described. In the description below, like reference numerals are used to describe the same, similar, or corresponding parts in the several views of the drawings. This detailed description defines the meaning of the terms used herein and specifically describes embodiments in order for those skilled in the art to practice the invention.

Definitions

The terms "about" and "essentially" mean ±10 percent.

The terms "a" or "an", as used herein, are defined as one or as more than one. The term "plurality", as used herein, is defined as two or as more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically.

The term "comprising" is not intended to limit inventions to only claiming the present invention with such comprising language. Any invention using the term comprising could be separated into one or more claims using "consisting" or "consisting of" claim language and is so intended.

References throughout this document to "one embodiment", "certain embodiments", "an embodiment", or similar terms means that a particular feature, structure, or characteristic described in connection with the embodiment is included in at least one embodiment of the present invention. Thus, the appearances of such phrases in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B, or C" means any of the following: "A; B; C; A and B; A and C; B and C; A, B, and C". An exception to this definition will occur only when a combination of elements, functions, steps or acts are in some way inherently mutually exclusive.

The drawings featured in the figures are for the purpose of illustrating certain convenient embodiments of the present invention and are not to be considered as limitations thereto. The term "means" preceding a present participle of an operation indicates a desired function for which there is one or more embodiments, i.e., one or more methods, devices, or apparatuses for achieving the desired function and that one skilled in the art could select from these or their equivalent in view of the disclosure herein and use of the term "means" is not intended to be limiting.

As used herein, the term "flying vertebrate" refers to birds, bats or any large flying mammal or the like.

As used herein, the term "rope" refers to cord, rope, string, or the like used to raise or lower the netting attached to it.

As used herein, the term "adjustable height support poles" refers to poles that can change in height by any means. In one embodiment, it is a telescoping pole that can lock in an up and down position. The pole has a hook at the top of a shape designed for attaching the pole to a portion of the ceiling such as the rafters, beams, or the like on a portion of the ceiling. There is a pulley attached to the hook. In one embodiment, the pulley is a carabiner. In another embodiment, the poles extend to 24 feet or more telescopically. In yet another embodiment, the hook is removeably attached by a quick release attachment. Quick release allows the user to change hook shapes easily for differing ceiling configurations. In yet another embodiment, the hook portion is bendable by hand to adapt it to unusual situations for attaching the hook to a portion of the ceiling.

As used herein, the term "positioning the netting for capture" refers to placing the bird net in an upper position wherein the flying vertebrate can fly into the netting.

As used herein, the term "large building" refers to buildings such as large box stores, warehouses, storage facilities, retail buildings, covered areas or other areas with overhead fixtures such as rafters, and the like. These types of buildings typically have high ceilings, making flying vertebrate removal very difficult.

As used herein, the term "pulley" refers to a device that the rope can pass through in order to raise or lower bird netting to the ends of the poles, such as the top. In one embodiment, it is a carabiner, as shown in the drawings. A plurality of devices to attach the net to the rope are placed on the rope. In one embodiment, the attachment device is a clip, as shown in the drawings.

As used herein, the term "bird netting" refers to nylon or other plastic netting designed in the trade for the capture of birds. These typically have one or more pockets designed to trap a bird, but that is just an embodiment. These types of nets run large and can have dimensions over 30 feet in length.

As used herein, the term "determining the species" refers to observing the flying vertebrate and having an expert, a guide book, or the like, for determining what kind of flying vertebrate needs to be captured. One can also observe the surrounding area for determination of the likely species to be captured in a large building, to aid in prevention of further entry by a flying vertebrate.

As used herein, the term "flight characteristics" refers to the flying vertebrate, once it has been identified, one can determine how it flies. e.g. a bat flies in a different pattern than a sparrow. That flight pattern can then be used to place the netting in relationship to the position of the flying vertebrate.

As used herein, the term "driving the flying vertebrate" refers to getting the flying vertebrate to fly, by making a loud noise, approaching the vertebrate, or by the placement of food, light, or odorant or the like. If the netting is placed correctly, then driving the vertebrate will cause it to fly into the netting and one of the pouches in the netting.

As used herein, the term "removal of the flying vertebrate from the netting" refers to a key part of the present invention wherein the flying vertebrate is manually removed from the net once captured.

As used herein, the term "adapting the building" refers to taking the information about what species of flying vertebrate has entered the building and then adapting the building so that that species cannot easily return to the inside of the building. So, for example, eliminating nesting spots or using repellant at spots normally used for nesting, both outside and inside the building. Also adapting the entrances to prevent the species of bird from entering the building. Other structural vulnerabilities are generally looked for, including looking for holes and gaps, locations for entry, nesting and the like.

DRAWINGS

In FIG. 1, the system capture pole 5 is collapsed with hook 9 and pulley 15 shown positioned in an upper position. The height adjustable poles 5 are shown having telescoped into their lowest position.

Figure 2:
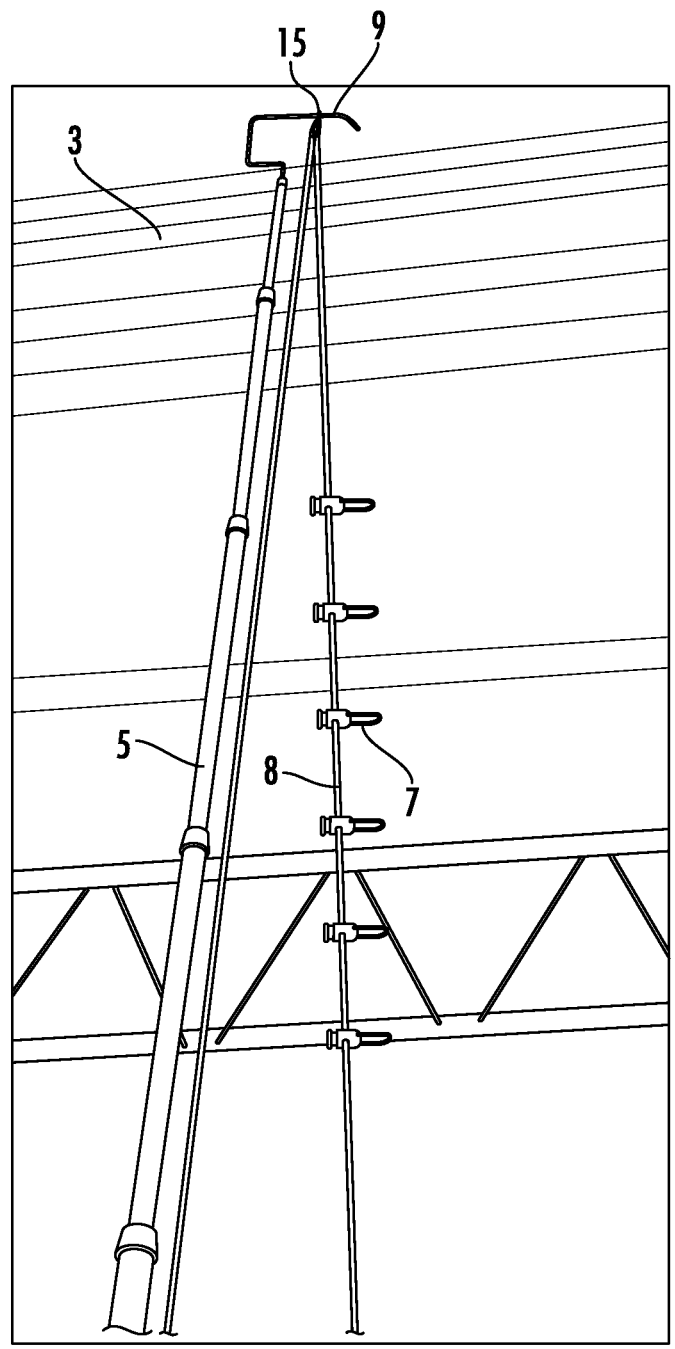
FIG. 2 is a perspective view of the rope with pulley (carabiner) attached to the pole.

FIG. 2 shows a single pole 5 extended with hook 9, pulley 15, rope 8, and clips 7 clearly shown. The hook is hung on rafter 3.

Figure 3:
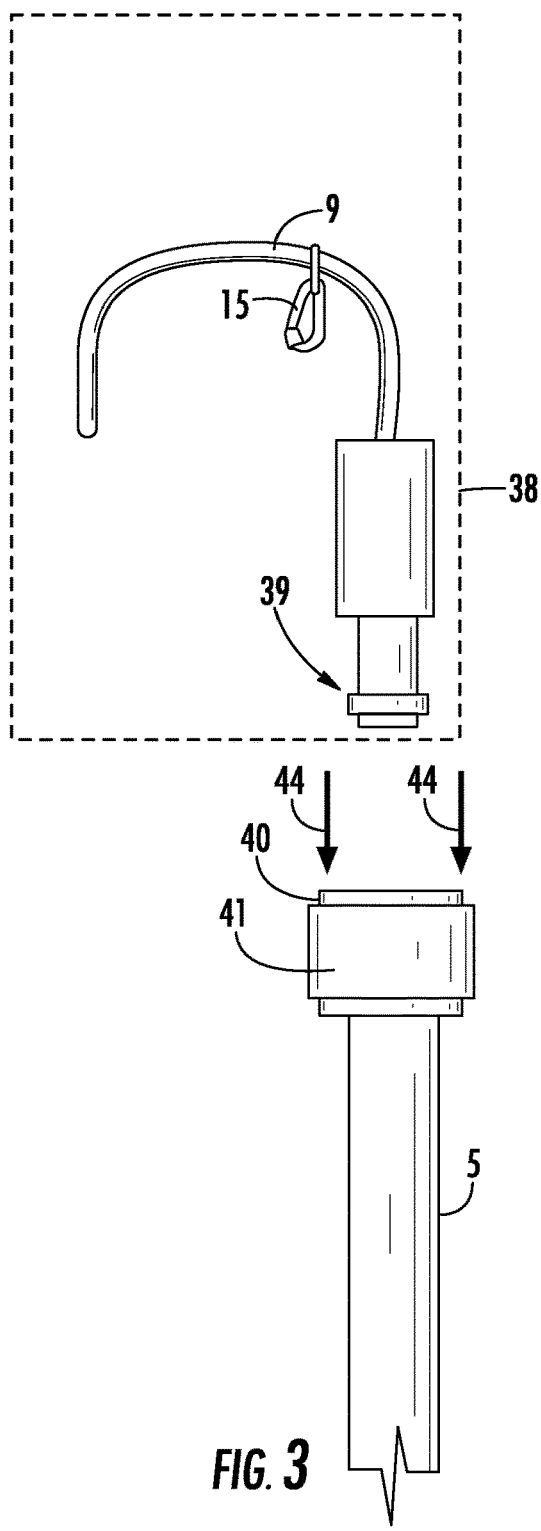
FIG. 3 is a perspective view of the quick release hook assembly with pole.

FIG. 3 is a perspective view of the quick release hook assembly 38 of the invention. In this view, hook 9 is bendable by hand to create a custom shape for use. At a bottom of the hook assembly 38 is quick release connector 39 which fits 44 into receiver connector 40 in telescoping pole 5. In one embodiment, Velcro (hook and loop fastener) 41 wraps around receiver connector 40 to prevent unwanted detachment of the hook assembly 38 when attached to pole 5.

Figure 4:
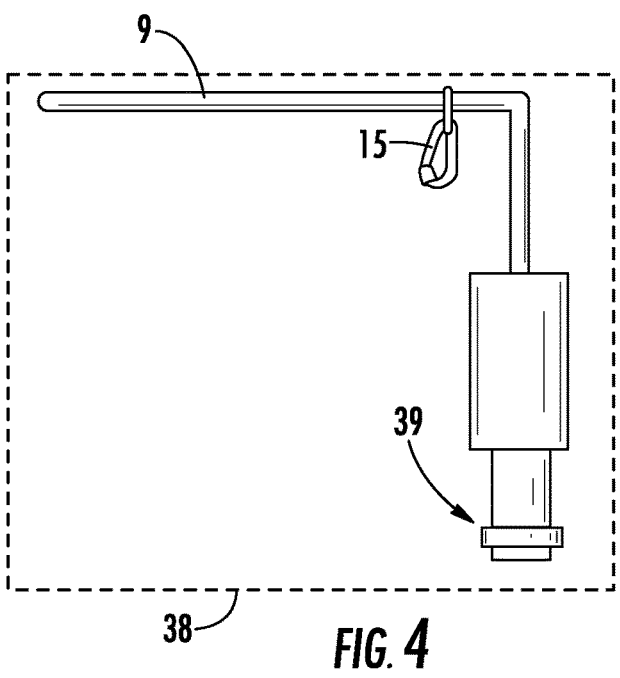
FIG. 4 is a perspective view of an alternative quick release design.

FIG. 4 is an alternate hook assembly wherein hook 9 is a right angle to pole 5.

Those skilled in the art to which the present invention pertains may make modifications resulting in other embodiments employing principles of the present invention without departing from its spirit or characteristics, particularly upon considering the foregoing teachings. Accordingly, the described embodiments are to be considered in all respects only as illustrative, and not restrictive, and the scope of the present invention is, therefore, indicated by the appended claims rather than by the foregoing description or drawings. Consequently, while the present invention has been described with reference to particular embodiments, modifications of structure, sequence, materials, and the like apparent to those skilled in the art still fall within the scope of the invention as claimed by the applicant.

What is claimed is:

1. A system for use in capturing a flying vertebrate in a building, the system comprising:
   a telescoping pole that includes: a hook positioned at a top end of the telescoping pole, a receiver connector, and a quick release connector configured to fit into the receiver connector such that the hook can be positioned at the top end of the telescoping pole;
   at least one bird net configured for being operatively connected to the telescoping pole; and
   a hook and loop fastener wrapped around the receiver connector to prevent unwanted detachment of the hook from the telescoping pole,
   wherein the hook is configured for being attached to a ceiling rafter in the building such that, when the hook is attached to the ceiling rafter, the at least one bird net can be positioned proximate to the ceiling rafter.

2. A system for use in capturing a flying vertebrate in a building, the system comprising:
   a telescoping pole;
   a hook positioned at a top end of the telescoping pole and configured for being attached to an elevated portion of a structure;
   a bird net configured for being operatively connected to the telescoping pole; and
   a rope extending up the pole to the hook and back down the pole, wherein the rope is attached to the hook and is also attached to the bird net via a plurality of attachment devices,
   wherein the hook is configured such that, when the hook is attached to the elevated portion of the structure, the bird net is positioned using the rope and the pole.

3. The system according to claim 2, wherein the rope is indirectly attached to the hook.

4. The system according to claim 2, wherein the rope is indirectly attached to the hook via a pulley.

5. The system according to claim 2, further comprising a pulley attached to the hook.

6. The system according to claim 5, wherein the pulley comprises a carabiner.

7. The system according to claim 5, wherein the rope is attached to the pulley, the plurality of attachment devices being configured for attaching the bird net directly to the rope.

8. The system according to claim 7, wherein the plurality of attachment devices comprise a plurality of clips.

9. The system according to claim 2, wherein the bird net includes one or more pockets configured for trapping the flying vertebrate.

10. The system according to claim 2, wherein the bird net has a length at least 30 feet.

11. The system according to claim 2, wherein the telescoping pole is configured for being extended to a length of at least 24 feet.

12. The system according to claim 2, wherein the telescoping pole includes a receiver connector and a quick release connector configured to fit into the receiver connector such that the hook can be positioned at the top end of the telescoping pole.

13. The system according to claim 12, further comprising a hook and loop fastener wrapped around the receiver connector to prevent unwanted detachment of the hook from the telescoping pole.

14. A system for use in capturing a flying vertebrate in a building, the system comprising:
   a pole;
   a hook positioned at a top end of the pole and configured for being attached to an elevated portion of a structure;
   a bird net configured for being connected to the pole; and
   a rope extending up the pole toward the hook and back down the pole, wherein the rope is attached to the pole and is also attached to the at least one bird net,
   wherein the hook is configured such that, when the hook is attached to the elevated portion of the structure, the bird net can be positioned using the rope and the pole.

15. The system according to claim 14, wherein the rope is indirectly attached to the pole.

16. The system according to claim 14, wherein the rope is indirectly attached to the pole via a pulley attached to the hook.

17. The system according to claim 16, wherein the pulley comprises a carabiner.

18. The system according to claim 16, wherein the rope is attached to the pulley, the plurality of attachment devices being configured for attaching the bird net directly to the rope.

19. The system according to claim 18, wherein the plurality of attachment devices comprise a plurality of clips.

20. The system according to claim 16, wherein the telescoping pole includes a receiver connector and a quick release connector configured to fit into the receiver connector such that the hook can be positioned at the top end of the telescoping pole.

* * * * *